Aug. 30, 1966  B. L. FROST  3,269,203
TRANSMISSION

Filed Dec. 23, 1963  7 Sheets-Sheet 2

INVENTOR
BARRY L. FROST
BY
ATTORNEYS

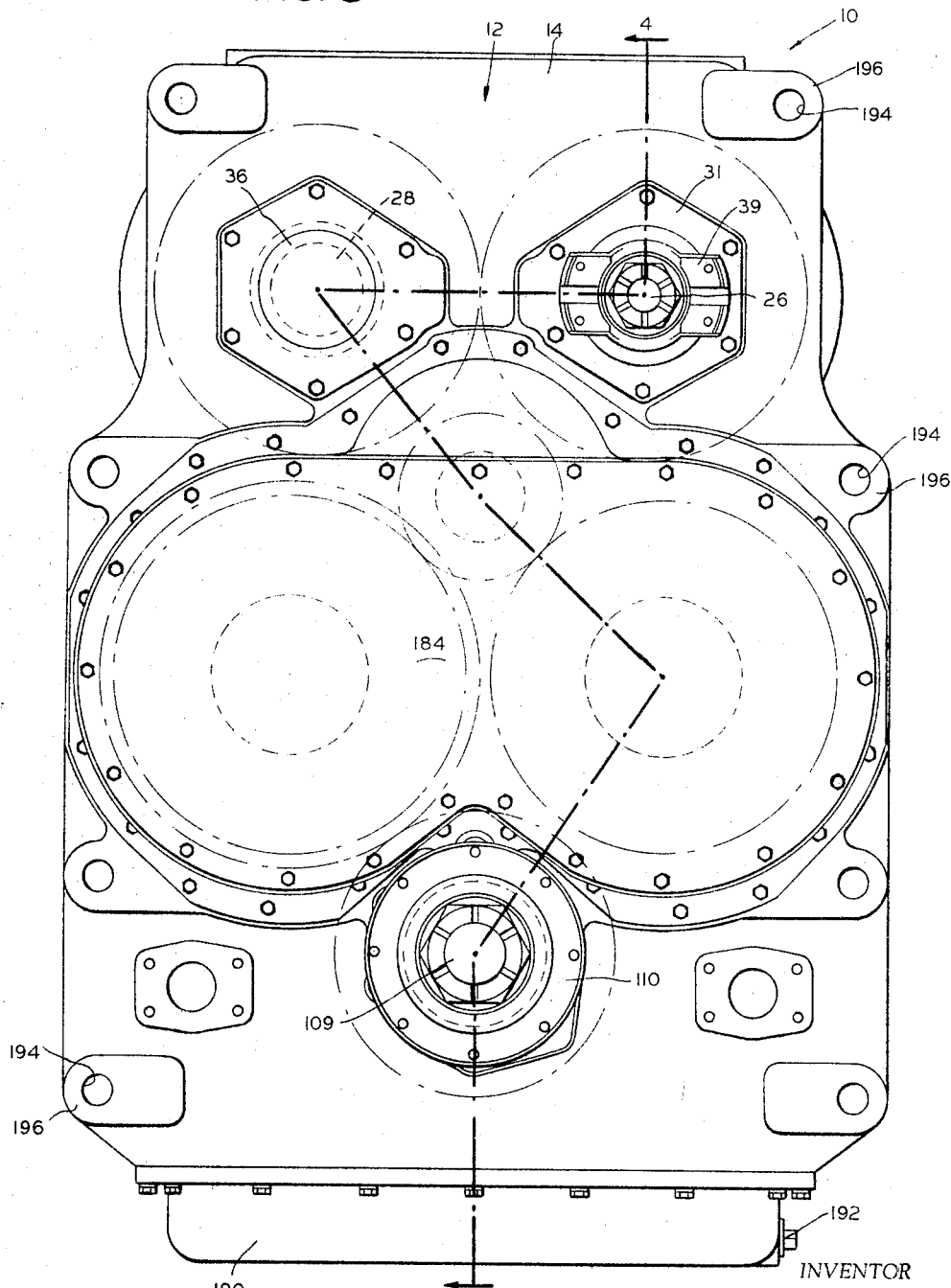

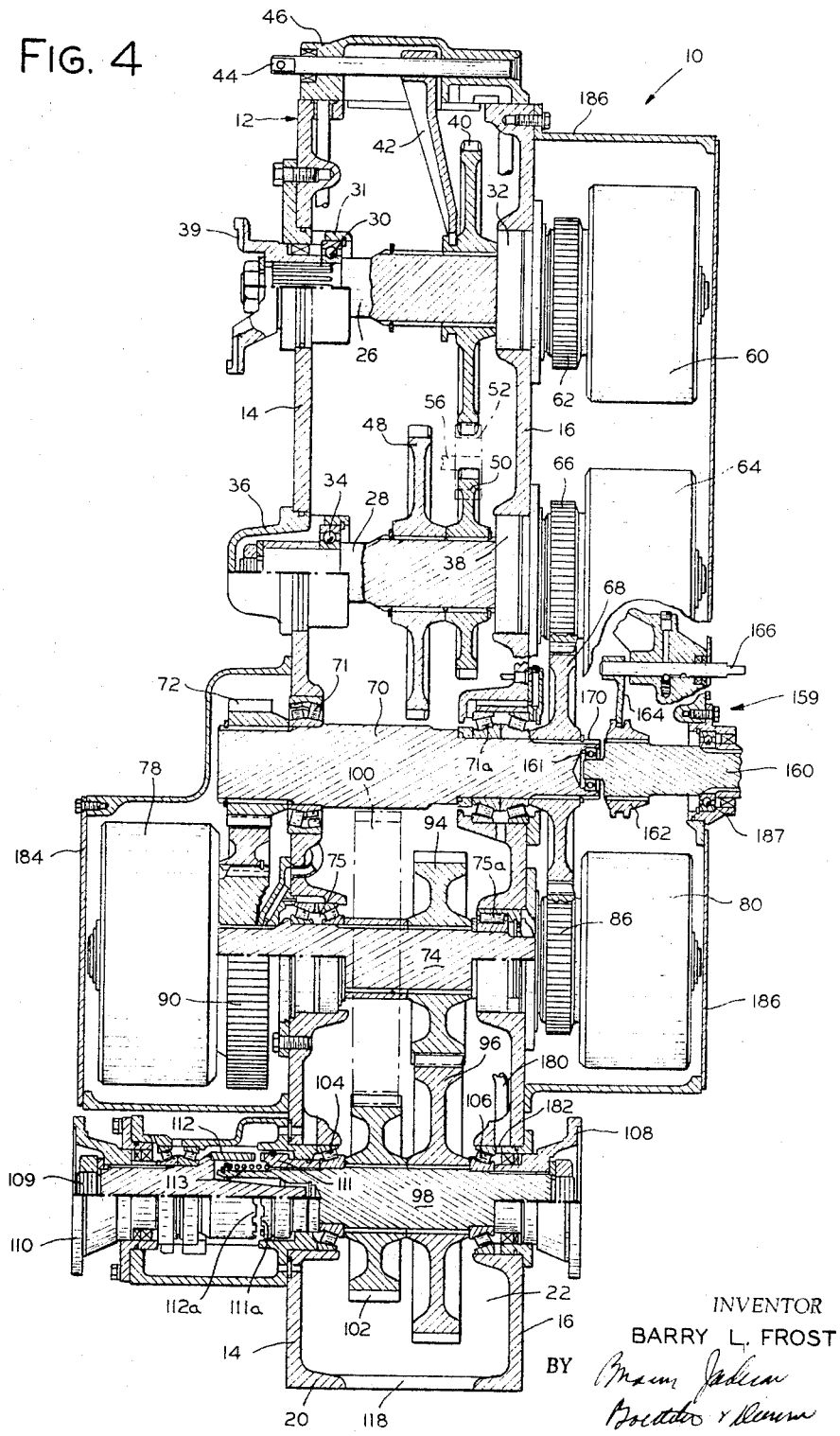

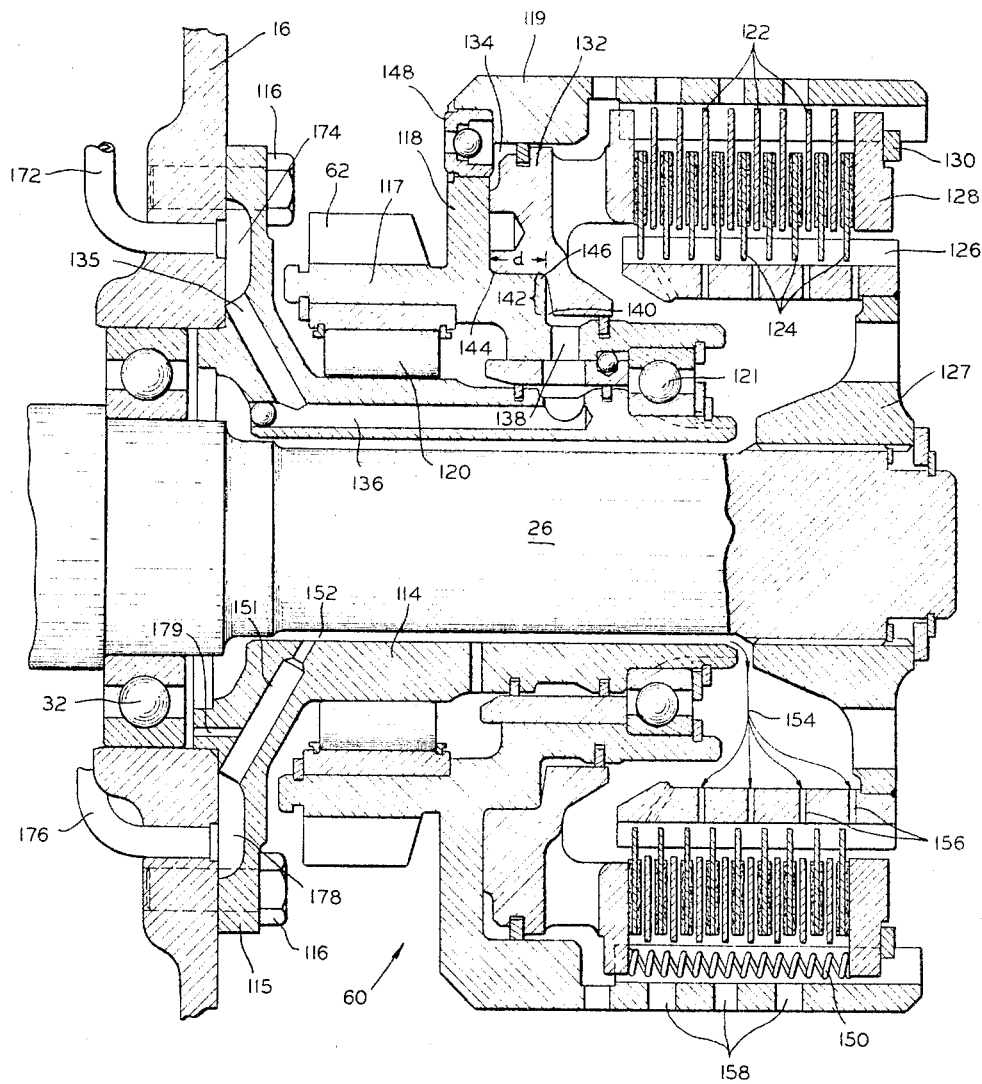

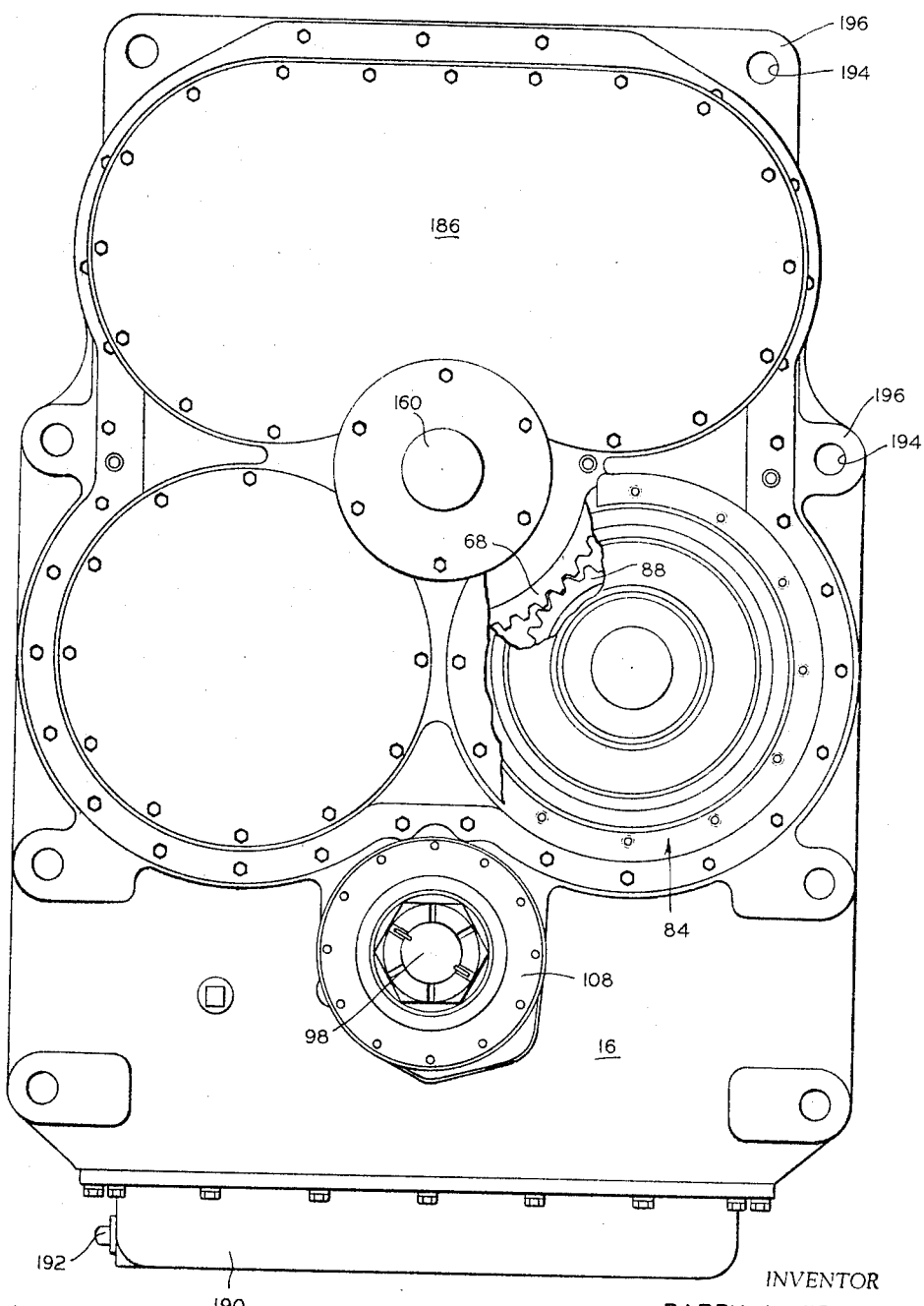

Aug. 30, 1966   B. L. FROST   3,269,203
TRANSMISSION
Filed Dec. 23, 1963   7 Sheets-Sheet 7

INVENTOR
BARRY L. FROST
BY
ATTORNEYS

United States Patent Office 3,269,203
Patented August 30, 1966

3,269,203
TRANSMISSION
Barry L. Frost, Jackson, Mich., assignor to Clark Equipment Company, a corporation of Michigan
Filed Dec. 23, 1963, Ser. No. 332,474
10 Claims. (Cl. 74—333)

My present invention relates generally to power transmission mechanisms for heavy duty automotive vehicles such as road graders and the like, and more particularly to improvements in a multi-ratio change speed power transmission mechanism of the type disclosed in the co-pending application of Ronald H. Bolster, Serial No. 79,365, filed December 29, 1960, now Patent No. 3,126,-752, issued March 31, 1964.

One embodiment of power transmission mechanism disclosed in the aforesaid co-pending application comprises a rotatable input shaft having a first clutch gear rotatable thereon and a first clutch for selectively connecting the first clutch gear to the input shaft, a rotatable reverse shaft having a second clutch gear rotatable thereon and a second clutch for selectively connecting the second clutch gear to the reverse shaft, constant mesh gear means driving the reverse shaft from the input shaft, and ratio gear means selectively driven from the first and second clutch gears. Engagement of the first clutch effects drive of the ratio gear means from the first clutch gear in a forward direction, while engagement of the second clutch effects drive of the ratio gear means from the second clutch gear in a reverse direction. The ratio gear means, in turn, comprises a plurality of rotatable shafts including an output shaft, and a plurality of constantly meshing gears including four additional clutch gears rotatable on certain of the shafts with ratio clutches associated therewith. The ratio clutches may be selectively engaged for clutching one of the four additional clutch gears to the adjacent shaft whereby any one of four drive ratios may be provided between the first or second clutch gears and the output shaft. This transmission thus has four drive ratios in either a forward or reverse direction of rotation.

It is an object of my present invention to provide a power transmission mechanism of the general character described, wherein the number of drive datios is increased, without rearrangement of the location of the axes of the rotatable shafts, and without any increase in the number of clutch gears or clutches, or in the overall size of the transmission housing.

In accomplishing this object, I eliminate the constant mesh gear means driving the reverse shaft from the input shaft, and substitute therefor a pair of gears secured to the reverse shaft, an idler gear in constant mesh with one of the gears on the reverse shaft, and a gear mounted on the input shaft for rotation therewith and axially shiftable therealong for meshing engagement with either the idler gear or the other of the two gears on the reverse shaft. By engaging the first clutch and one of the ratio clutches, the output shaft is driven in one of a first set of four ratios in a forward direction. When the shiftable gear on the input shaft is in meshing engagement with the idler gear, engagement of the second clutch and one of the ratio clutches effects drive of the output shaft in one of a second set of four ratios in a forward direction. Then, when the shiftable gear on the input shaft is in meshing engagement with the said other of the two gears on the reverse shaft, engagement of the second clutch and one of the ratio clutches effects drive of the output shaft in one of a set of four ratios in a reverse direction. Accordingly, in the present embodiment of my invention, the reverse shaft serves in effect as a forward-reverse shaft, and the transmission has eight drive ratios in a forward direction and four drive ratios in a reverse direction.

Now in order to acquaint those skilled in the art with the manner of constructing and using transmissions in accordance with the principles of my present invention, I shall describe in connection with the accompanying drawings a preferred embodiment of my invention.

In the drawings:

FIGURE 3 is a front elevational view of the transmission of FIGURE 1;

FIGURE 4 is a sectional view, taken substantially along the line 4—4 of FIGURE 3, looking in the direction indicated by the arrows;

FIGURE 6 is a vertical sectional view, on an enlarged scale, of one of the clutches of FIGURE 4;

Figure 1:
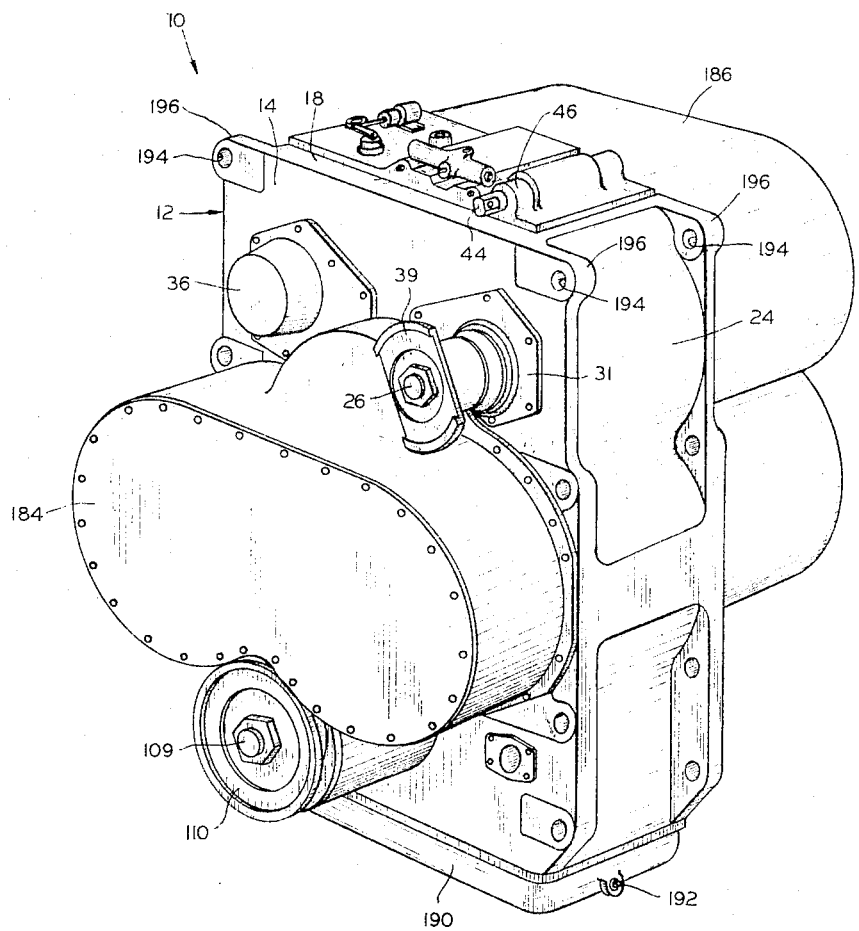
FIGURE 1 is a perspective view of the exterior of a transmission incorporating the principles of my present invention.
Figure 2:
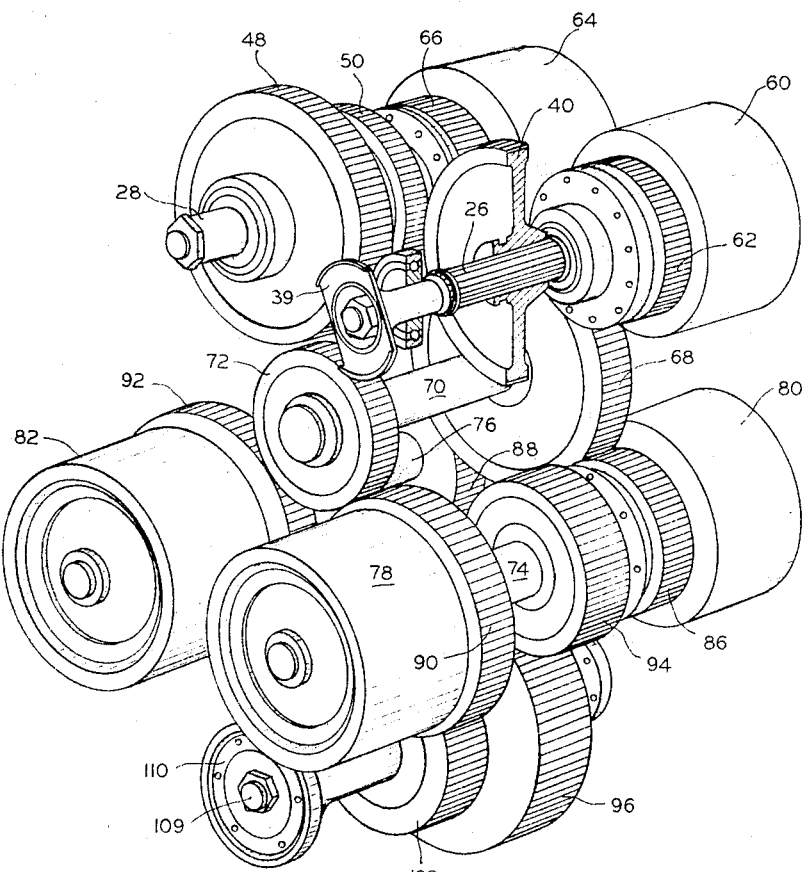
FIGURE 2 is a perspective view of the transmission of FIGURE 1, taken from approximately the same point as FIGURE 1, but with the housing and cover members removed to show the shafts, gears and clutches.
Figure 8:
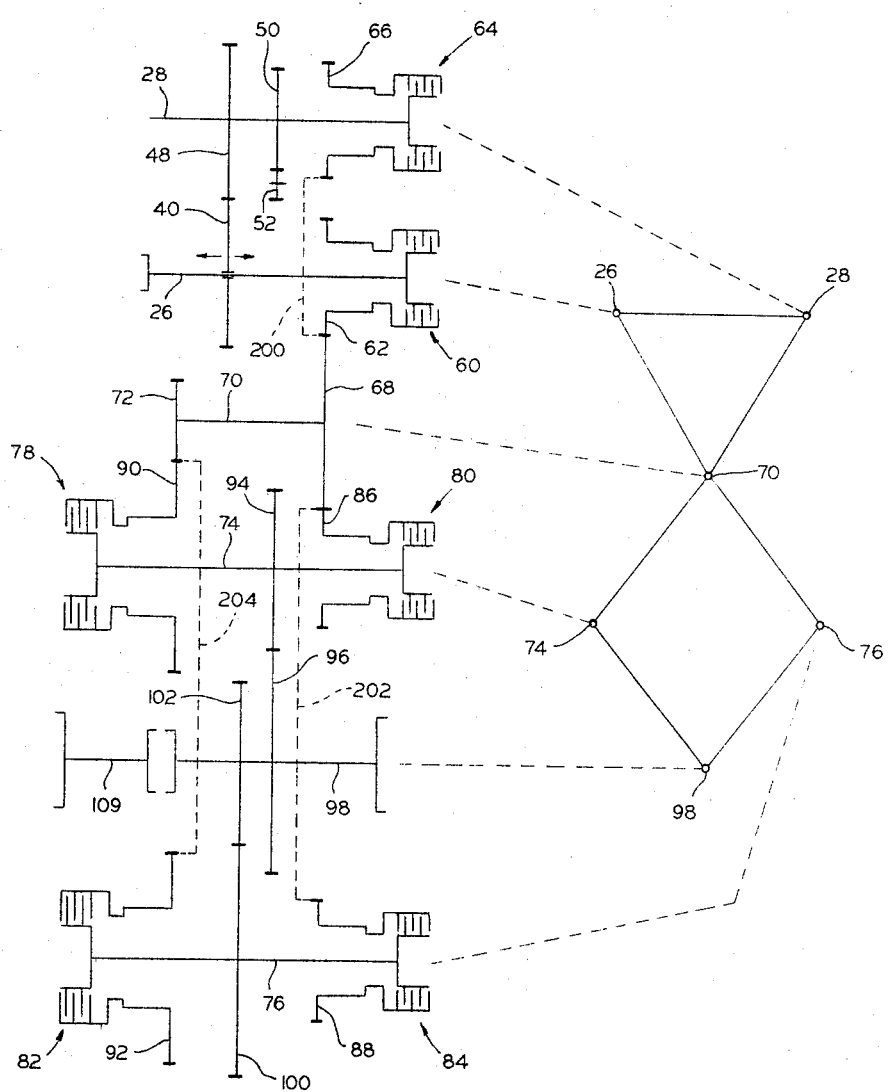

FIGURE 7 is a rear elevational view of the transmission of FIGURE 1 with portions of the housing and cover member being broken away to show certain parts which are not visible in other views; and FIGURE 8 is a two-part diagrammatic representation of the transmission of FIGURES 1 through 7 showing on the left a developed schematic diagram in which the gears, shafts and clutches are shown with the shaft centers in one plane, and on the right a diagram of the actual position, as viewed from the rear end, of the centers of the shafts.

Referring now to FIGURES 1 through 4, there is indicated generally by the reference numeral 10 a transmission incorporating the principles of my present invention. The transmission 10 comprises a housing 12 having front and rear vertically disposed walls 14 and 16, upper and lower walls 18 and 20, and side walls 22 and 24.

Located near the top of the front and rear housing walls 14 and 16 are an input shaft 26 and a laterally spaced forward-reverse shaft 28. The input shaft 26 is journaled in a bearing assembly 30 mounted in a bearing holder 31 secured within the front housing wall 14 and in a bearing assembly 32 mounted in the rear housing wall 16. In a similar manner, the forward-reverse shaft 28 is journaled in a bearing assembly 34 mounted in a bearing holder 36 secured within the front housing wall 14 and in a bearing assembly 38 mounted in the rear housing wall 16.

Figure 5:
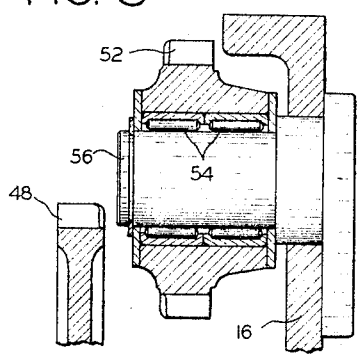
FIGURE 5 is a fragmentary view, partly in elevation and partly in section, showing one of the idler gears and mounting means therefor of the transmission of FIGURE 1.

Secured to the input shaft 26 outwardly of the forward housing wall 14 is a portion 39 of a coupling device that is adapted to be connected to the coupling portion of the drive shaft of prime mover means (not shown). Also mounted on the input shaft 26 for rotation therewith intermediate of the front and rear housing walls 14 and 16 is an input gear 40. The gear 40 is adapted to be shifted axially along the input shaft 26 by means of a shift fork 42 secured to a shift rod 44 slidably mounted in a cover member 46 secured to the housing 12. Suitably secured to the forward-reverse shaft 28 intermediate of the front and rear housing walls 14 and 16 are a pair of gears 48 and 50. The gear 50 is in constant mesh with an idler gear 52 which, as shown in FIGURE 5, is rotatably mounted by means of needle bearings 54 on a stub shaft 56 secured in the rear housing wall 16. As best shown in FIGURE 4, the input gear 40 is adapted to be shifted axially into meshing engagement either with the idler gear 52 or the gear 48 on the forward-reverse shaft for a purpose to be described hereinafter.

Located outwardly of the rear housing wall 16 are a clutch 60, which may be selectively actuated to connect a gear 62 for rotation with the input shaft 26, and a clutch 64, which may be selectively actuated to connect a gear 66 for rotation with the forward-reverse shaft 28. The detailed construction of clutches 60 and 64 is shown in FIGURE 6 and will be described hereinafter. Both gears 62 and 64 are in constant mesh with a gear 68 which is secured outwardly of the rear housing wall 16 to one end of an idler shaft 70. The shaft 70 is located at a level below the input and forward-reverse shafts 26 and 28 and is journaled in a pair of bearing assemblies 71 and 71a mounted respectively in the front and rear housing walls 14 and 16. Secured to the opposite end of the idler shaft 70 outwardly of the front housing wall 14 is a gear 72.

The transmission 10 further comprises a pair of intermediate shafts 74 and 76 located at a level below the idler shaft 70. The shafts 74 and 76 are each journaled in a pair of bearing assemblies mounted respectively in the front and rear housing walls 14 and 16, the bearing assemblies for the shaft 74 being identified by the reference numerals 75 and 75a. Outwardly of the front and rear housing walls 14 and 16 respectively, the ends of the shaft 74 have associated therewith ratio clutches 78 and 80, and the ends of the shaft 76 have associated therewith ratio clutches 82 and 84 (visible in FIGURE 7).

The gear 68 on the idler shaft 70 is in constant mesh with a gear 86, which may be selectively connected by the clutch 80 to the intermeidate shaft 74, and also with a gear 88, which may be selectively connected by the clutch 84 (see FIGURE 7) to the intermediate shaft 76. Similarly, the gear 72 on the idler shaft 70 is in constant mesh with a gear 90, which may be selectively connected by the clutch 78 to the intermediate shaft 74, and also with a gear 92, which may be selectively connected by the clutch 82 to the intermediate shaft 76.

Mounted on the intermediate shaft 74 for rotation therewith intermediate of the front and rear housing walls 14 and 16 is a gear 94. The gear 94 is in constant mesh with a gear 96 which is secured to an output shaft 98 located at a level below the intermediate shafts 74 and 76. A gear 100 is mounted on the intermediate shaft 76 intermediate of the front and rear housing walls 14 and 16 and is in constant mesh with a gear 102 which likewise is mounted on the output shaft 98. The output shaft 98 is journaled in the front and rear housing walls 14 and 16 by means of bearing assemblies 104 and 106.

Mounted on the end of the output shaft 98 adjacent the rear housing wall 16 is a portion 108 of a coupling device providing for coupling of the output shaft to a propeller shaft (not shown) for operating the rear wheels of a vehicle or other device to be operated by the transmission. The end of the output shaft 98 adjacent the front housing wall 14 is recessed and journaled therein is the reduced rearward end portion of an auxiliary optional output shaft 109. Secured to the forward end of the optional output shaft 109 is a portion 110 of a coupling device which may be connected to a corresponding coupling portion (not shown) on the end of a propeller shaft leading to the front wheels of a vehicle or other instrumentality to be driven by the optional output shaft 109.

The clutch structure by which the shaft 109 may be driven from the output shaft 98 at the operator's option includes a collar member 111 rotatable with the shaft 98 and axially shiftable therealong. The collar member 111 is provided with axially projecting teeth 111a that are arranged to engage the axially projecting teeth 112a on a collar member 112 secured to the shaft 109. The collar 111 is slidable axially to the left by suitable mechanical or power operating mechanism (not shown), and is returned to the right by a return spring 113 when it is desired to disconnect the shaft 109 from the shaft 98. With this transmission installed in a vehicle, the shaft 109 is connected with the shaft 98 when it is desired to provide the vehicle with four-wheel drive; however, when only two-wheel drive is desired, the shaft 109 is disconnected and the sole drive is provided by the shaft 98 through the coupling portion 108 at the rearward end thereof.

The details of construction of the clutch 60 are illustrated in FIGURE 6. Since the clutches 64, 80 and 84 are identical with the clutch 60, while the clutches 78 and 82 are the same as clutch 60 except as to size, an explanation of clutch 60 will suffice for all of these clutches.

In FIGURE 6 there is indicated by the reference numeral 114 a fixed annular sleeve or quill member which is connected by means of a flange portion 115 thereon to the rear surface of the rear housing wall 16 in a suitable manner such as by a plurality of machine screws 116. As shown, gear 62 is formed integrally on an axial projection 117 extending from the radial flange portion 118 of a clutch drum 119. The combined gear and clutch drum structure is rotatably mounted on the tubular portion of member 114 by means of a roller bearing assembly 120 and a ball bearing assembly 121. The drum 119 carries a plurality of annular friction disks 122 which are splined to the clutch drum interiorly thereof for rotation therewith. Interleaved between the friction disks 122 are alternate annular disks 124 which are splined to the exterior of an annular hub member 126 having a radial flange portion 127 secured to the input shaft 26 for rotation therewith.

The clutch structure includes a backing plate or ring 128 which is secured at the outer end of the drum 119 in a suitable manner such as by a snap ring 130. The clutch 60 is engaged by compressing the stack of disks 122 and 124, and this is accomplished by an annular piston member 132. The piston 132 is mounted for axial movement in a chamber 134 which is formed inside the drum 119 adjacent the drum flange 118.

The piston 132 is moved to the right by fluid under pressure which is admitted through a slanted passageway 135 in the member 114 to a longitudinal passageway 136 from which it passes through suitable sealing means to a passageway 138 in the drum member and then into chamber 134 behind or to the left of piston 132 at location 140. Initial movement on the piston 132 is rapid upon the admission of fluid under pressure because only a small portion of the annular cross sectional end area of the piston 132 is effective initially. The radial width of this initial effective area is indicated in FIGURE 6 by the numeral 142 and bracket associated therewith. After piston 132 has moved a distance "d" to the right and the shoulder portion 144 on the piston passes the shoulder 146 on the adjacent drum member, the full annular end area of the piston 132 is exposed to pressurized fluid. This, of course, provides much greater pressure on the piston. The effect of the structure and operation just described is that the piston 132 moves rapidly in the initial stages with a relatively small force and slowly in the terminal stages with a relatively large force. When it nears the end of its stroke to the right to provide clutch engagement, the increased force on the piston insures complete clutch engagement and lack of slippage during operation. When it is desired to disengage the clutch 60 the source of pressurized fluid is disconnected and fluid is released from the chamber 134 by means of a check valve 148. The piston 132 is then returned to the position shown by a plurality of springs 150 extending between the piston and the backing ring 128, one of which is visible near the bottom of FIGURE 6. As indicated in the drawing, portions of the multiple disks 122 are omitted or cut off at intervals around the periphery of these disks, to accommodate the return springs 150 which are disposed within the corresponding spline grooves in the drum 119. For more information concerning the valve 148, reference may be had to Patent No. 2,954,040, wherein this valve is disclosed in detail and claimed.

For cooling the clutch 60 during the time when it is not engaged and there is relative motion between the alternate friction disks, a passageway 151 is provided in the member 114 through which cooling fluid is supplied under pressure to the annular space 152 between the shaft 26 and the sleeve member 114. From the space 152, the fluid flows along the path indicated by the line 154 through a series of openings 156 in the hub member 126, then over the surfaces of the disks 122 and 124 and out through a series of openings 158 in the drum member 119; after which such fluid drains by gravity to the bottom of the housing 12.

As shown in FIGURE 4, the transmission 10 may also be provided with a power take-off indicated generally by the reference numeral 159. The power take-off mechanism 159 comprises a shaft 160 which is arranged to be selectively connected to the shaft 70 in order to drive simultaneously an auxiliary device on a vehicle or other device in addition to the mechanism driven by the main output shaft 98. The shaft 160 is journaled at one end in a bearing assembly 161 mounted within the adjacent end of the shaft 70 and is connected to the shaft 70 merely by shifting collar 162 to the left by means of a shifter fork 164 which is operated by a rod 166. The collar 162 is formed with internal splines which mesh with the external splines 168 on the shaft 160 and which, when the collar 162 is moved to the left, also mesh with the external splines 170 on the shaft 70 thereby effecting a driving connection between the shafts 70 and 160.

While most of the piping has been omitted from the drawings for simplification, it will be appreciated by those skilled in the art that a pump or other source of pressurized fluid is provided which supplies fluid for the operation and cooling of all the clutches and also for the pressure lubrication of all bearings as described hereinafter. Such pressurized fluid is regulated as to pressure and is controlled by suitable control valves (not shown) in a manner such that it is admitted selectively to the clutches which are to be actuated. In FIGURE 6, there appears a fragmentary portion of a conduit or pipe 172 that supplies pressurized fluid to a chamber 174 from which fluid flows through passageway 135 and then into the clutch actuating chamber in the manner previously described. A conduit or pipe 176 supplies cooling fluid to the clutch 60 through the rear housing wall 16 into a chamber 178 and then through the passageway 151 and the space 152 in the manner previously described to cool the clutch disks. It will be appreciated that the clutches 64, 78, 80, 82 and 84 are actuated and cooled in the same manner described for clutch 60.

Each of the bearing assemblies associated with the clutches is continuously lubricated by fluid under pressure and this is illustrated in FIGURE 6. For example, a passageway 179 directs pressurized fluid from passageway 151 through bearing 32 continuously. Each of the other bearing assemblies in the transmission also is continuously lubricated in a similar manner and this is illustrated by the conduit 180, a fragment of which is illustrated in FIGURE 4. The conduit 180 directs pressurized fluid through an opening 182 and provides for the continuous flow of lubricant through the bearing assembly 106.

As shown in FIGURES 1 and 4, a cover member 184 is secured to the front housing wall 14 for enclosing the two clutches 78 and 82 and the three gears 72, 90 and 92. A similar cover member 186 is secured to the rear housing wall 16 for enclosing the four clutches 60, 64, 80 and 84 and the five gears 62, 66, 68, 86 and 88. The cover member 186 also serves to support a bearing assembly 187 in which the power take-off shaft 160 is rotatably mounted. The bottom housing wall 20 is provided with an opening 188 which is enclosed by a pan or sump member 190 having a drain plug 192. The pan 190 provides a reservoir for the liquid used in the transmission for lubrication, cooling and actuation of the clutches. The transmission may be installed within a vehicle or the like by the use of bolts or other securing devices disposed through the openings 194 in the bosses 196 of the housing 12.

The transmission described and illustrated herein provides for the rotation of the output shaft 98 in one direction at any one of eight different gear ratios and in the other direction at any one of four different gear ratios. This transmission is intended primarily for use in a vehicle; therefore the two directions will be referred to in the following description of the operation of the transmission as forward and reverse. To operate the output shaft 98 in any one of a first set of four ratios in a forward direction, clutch 60 is engaged, this clutch being referred to in the following explanation as the forward clutch. The first forward ratio is provided by engaging clutch 78 in addition to clutch 60. The drive can then be traced from input shaft 26 through clutch 60 and gears 62 and 68 to idler shaft 70 and then through gears 72 and 90 and through clutch 78 to intermediate shaft 74 from which gears 94 and 96 drive output shaft 98. A second forward ratio may be obtained by disengaging the clutch 78 and engaging the clutch 82. In this ratio the drive is the same down to the idler shaft 70 from which it may be traced through gears 72 and 92, through clutch 82 to intermediate shaft 76, and then through gears 100 and 102 to the output shaft 98. If a third forward ratio is desired, clutch 82 is disengaged and clutch 80 is engaged. The drive may then be traced from the gear 68 through the gear 86 and the clutch 80 to the shaft 74 and then through gears 94 and 96 to the shaft 98. A fourth forward ratio is provided by disengaging clutch 80 and engaging clutch 84 whereupon the drive is from the gear 68 through the gear 88 to the clutch 84, and then through the shaft 76 and the gears 100 and 102 to the shaft 98.

When the input gear 40 is in meshing engagement with the idler gear 52, which is in constant mesh with the gear 50 on the forward-reverse shaft 28, the output shaft 98 may be operated in any one of a second set of four ratios in a forward direction. In this case, the forward clutch 60 is disengaged and the forward-reverse clutch 64 is engaged whereupon the drive may be traced from the input shaft 26 through the gears 40, 52, and 50 to the forward-reverse shaft 28, and then through the clutch 64 and the gears 64 and 68 to the idler shaft 70 which will rotate in the same direction as, but at a different speed than, when clutch 60 is engaged. Each one of the four different drive ratios may then be established between the idler gear 68 or the idler shaft 70 and the output shaft 98 by selectively engaging the ratio clutches 78, 82, 80 and 84. The four several paths of power transmission between the idler gear 68 or the idler shaft 70 and the output shaft 98 are the same as described above in connection with the first set of four ratios in a forward direction. In sum, engagement of the forward clutch 60 conditions the transmission for four forward drive ratios, while engagement of the forward-reverse clutch 64 when the gears 52 and 40 are in meshing engagement conditions the transmission for four additional forward drive ratios.

When a change in drive ratios is made among the ratio clutches 78, 80, 82 and 84, it will be appreciated that the drum of the clutch that is engaged is already operating at the desired speed. Consider, for example, the ratio change mentioned hereinbefore in which clutch 78 is disengaged and the clutch 82 is engaged. The gear 92 on the drum of the clutch 82 is in constant mesh with the gear 72 the same as the gear 90 on the clutch drum 78. The drum of the clutch 82 therefore rotates continuously during the time that the clutch 78 is applied. Assuming that the engine speed remains constant during a shift, then the clutch drum 82 will be operating at the same speed after the shift as before, although it will be understood that if such a shift is made under load, that is, without temporarily removing the load connected to the output shaft, there will be a momentary reduction in the speed of the drum of the clutch 82 during engagement of this clutch as the shaft 76, gears 100 and 102 on the output shaft and the load connected thereto are accelerated to speeds corresponding to the speed of the drum or the clutch 82. The operation of this transmission is similar in this respect for all ratio changes involving the ratio clutches 78, 82, 80 and 84 whether shifting up or shifting down.

To operate the output shaft 98 in any one of four ratios in a reverse direction, drive power to the input shaft 26 is interrupted and, as soon as rotation thereof has ceased, the input gear 40 is shifted out of meshing engagement with the idler gear 52 and into meshing engagement with the gear 48 on the forward-reverse shaft 28. Then, drive power is again applied to the input shaft 26 and the forward-reverse clutch 64 is engaged, whereupon the drive may be traced from the input shaft 26 through the gears 40 and 48 to the forward-reverse shaft 28, and then through clutch 64 and gears 66 and 68 to the idler shaft 70 which then rotates in the opposite direction to that previously described when gears 40 and 48 were not in meshing engagement. It will be understood that each of the first four ratios previously described for forward operation when the clutch 60 was engaged may be obtained for reverse operation and may be traced in the same manner from the idler gear 68 or the idler shaft 70. The only difference is that the idler shaft 70 now is turning in the opposite direction so that the output shaft likewise turns in the opposite direction. As illustrated, the gears 40 and 48 are identical as are the gears 62 and 66. Therefore, when the gears 40 and 48 are in meshing engagement, engagement of the forward clutch 60 conditions the transmission for four forward drive ratios, while engagement of the forward-reverse clutch 64 conditions the transmission for four reverse drive ratios, the several ratios of the multiple gear reduction paths between the input and output shafts 26 and 98 being exactly the same for both directions of rotation. Should eight forward drive ratios again be desired, drive power to the input shaft 26 may be interrupted and, when rotation thereof has ceased, the input gear 40 may be shifted out of meshing engagement with the gear 48 and into meshing engagement with the idler gear 52.

Referring now to FIGURE 8, there is shown at the left a developed schematic diagram of the transmission 10 with all shaft centers lying in a single plane. Each of the shafts and gears and clutches is numbered to correspond with the preceding figures and it is indicated by the dashed line 200 that gear 66 is in mesh with gear 68. In a similar manner it is indicated by dashed line 202 that gear 88 is in mesh with gear 68 and by dashed line 204 that gear 92 is in mesh with gear 72. At the right of FIGURE 8 is shown a diagram of the actual location of the centers of the various shafts (viewed from the rear) and each of these is connected by a dashed line to the respective shafts in the left portion of FIGURE 8.

From the foregoing description, it will be appreciated that the number of different parts that must be manufactured for the transmission 10 are maintained at a minimum. Clutch assemblies 60, 64, 80 and 84 are all identical and clutch assemblies 78 and 82 are identical to each other. Moreover, the shafts 74 and 76 are identical, and the gear 94 is identical to the gear 102, while the gear 96 is identical to the gear 100. Thus, with respect to the two intermediate shaft assemblies, it is possible to manufacture two complete sets of parts which are identical instead of manufacturing two completely dissimilar sets of parts. To achieve the desired gear ratios two of the final drive gears, that is, gears 100 and 102 are reversed during assembly so that the gear 102 with the smaller number of teeth is on the output shaft 98.

In addition, it is possible to utilize parts from the transmission described and illustrated herein in other transmissions of the same design but of different sizes. Thus, for transmissions having lower capacity requirements, clutches identical to clutches 60, 64, 80 and 84 may be used in place of the clutches 78 and 82, while for a transmission having higher capacity requirements, clutches identical to clutches 78 and 82 may be used in place of the clutches 60, 64, 80 and 84. Moreover, it is possible readily to adjust gear ratios without changing the basic construction of the transmission. For example, it is possible to change the number of teeth on the gears 94 and 96 without changing any other parts of the transmission and thereby achieve a change in the gear reductions of the first and third ratios of each set of ratios. The gears 100 and 102 may be similarly changed, as may also other gear combinations such as 72, 90 and 92, or 68, 86 and 88.

For further details concerning the various advantages and other embodiments of transmissions upon which the transmission herein disclosed is an improvement, reference may be had to the aforesaid co-pending application of Ronald H. Bolster.

While I have shown and described what I believe to be a preferred embodiment of my present invention, it will be understood by those skilled in the art that various rearrangements and modifications may be made therein without departing from the spirit and scope of my invention.

I claim:
1. In a transmission, an input shaft, a first clutch gear rotatable on said input shaft, a first clutch adapted to selectively connect said first clutch gear to said input shaft, a forward-reverse shaft, a second clutch gear rotatable on said forward-reverse shaft, a second clutch adapted to selectively connect said second clutch gear to said forward-reverse shaft, a pair of gears secured to said forward-reverse shaft, an idler gear in constant mesh with one of said gears on said forward-reverse shaft, a gear mounted on said input shaft for rotation therewith and being axially shiftable therealong for meshing engagement with either said idler gear or the other of said gears on said forward-reverse shaft, and gear means selectively driven from said first and second clutch gears.

2. In a transmission, an input shaft, a first clutch gear rotatable on said input shaft, a first clutch adapted to selectively connect said first clutch gear to said input shaft, a forward-reverse shaft, a second clutch gear rotatable on said forward-reverse shaft, a second clutch adapted to selectively connect said second clutch gear to said forward-reverse shaft, a pair of gears secured to said forward-reverse shaft, an idler gear in constant mesh with one of said gears on said forward-reverse shaft, a gear mounted on said input shaft for rotation therewith and being axially shiftable therealong for meshing engagement with either said idler gear or the other of said gears on said forward-reverse shaft, and a multi-ratio gear train including a gear in constant mesh with said first and second clutch gears.

3. A transmission comprising a plurality of rotatable shafts arranged in parallel relation including an input shaft, a forward-reverse shaft, an output shaft and a pair of intermediate shafts, a pair of gears secured to said forward-reverse shaft, an idler gear in constant mesh with one of said gears on said forward-reverse shaft, a gear mounted on said input shaft for rotation therewith and being axially shiftable therealong for meshing engagement with either said idler gear or the other of said gears on said forward-reverse shaft, means for driving said intermediate shafts selectively from said input or forward-reverse shafts including a plurality of gears and four clutches associated with said intermediate shafts, and gear means for drivingly interconnecting said intermediate shafts and said output shaft.

4. A transmission comprising a plurality of rotatable shafts arranged in parallel relation including an input shaft, a forward-reverse shaft, an output shaft and a pair of intermediate shafts, a pair of gears secured to said forward-reverse shaft, an idler gear in constant mesh with one of said gears on said forward-reverse shaft, a gear mounted on said input shaft for rotation therewith and being axially shiftable therealong for meshing engagement with either said idler gear or the other of said gears on said forward-reverse shaft, means for driving said intermediate shafts selectively from said input or forward-reverse shafts including a plurality of gears and four clutches associated with said intermediate shafts, first and second output gears secured to said output shaft for the rotation thereof, a third gear secured to one of said intermediate shafts and in constant mesh with said first output gear, and a fourth gear secured to the other of said intermediate shafts and in constant mesh with said second output gear.

5. In a transmission, an input shaft, a first clutch gear rotatable on said input shaft, a first clutch adapted to selectively connect said first clutch gear to said input shaft, a forward-reverse shaft, a second clutch gear rotatable on said forward-reverse shaft, a second clutch adapted to selectively connect said second clutch gear to said forward-reverse shaft, a pair of gears secured to said forward-reverse shaft, an idler gear in constant mesh with one of said gears on said forward-reverse shaft, a gear mounted on said input shaft for rotation therewith and being axially shiftable therealong for meshing engagement with either said idler gear or the other of said gears on said forward-reverse or the other of said gears on said forward-reverse shaft, a pair of intermediate shafts, four ratio clutch gears, two rotatable on each of said pair of intermediate shafts, four clutches adapted to selectively connect said four ratio clutch gears to said intermediate shafts, an idler shaft, a first idler gear secured to said idler shaft and in constant mesh with said first and second clutch gears and also in constant mesh with two of said ratio clutch gears, a second idler gear secured to said idler shaft and in constant mesh with the other two of said ratio clutch gears, a first gear secured to one of said intermediate shafts, a second gear secured to the other of said intermediate shafts, an output shaft, and a pair of gears secured to said output shaft and in constant mesh respectively with said first and second gears on said intermediate shafts 6. A multi-ratio change speed transmission providing eight drive ratios in one direction and four drive ratios in the other direction comprising six rotatable shafts arranged in parallel relation including an input shaft, a forward-reverse shaft, an idler shaft, a pair of intermediate shafts and an output shaft, a first clutch located at one end of said input shaft, a second clutch located at one end of said forward-reverse shaft, four ratio clutches located respectively at the ends of said pair of intermediate shafts, each of said six clutches including a plurality of friction disk members carried by the respective shaft end for rotation therewith, a rotatable drum surrounding the respective shaft end and carrying a plurality of friction disks interleaved with said friction disks on the shaft, and means for compressing the disk assembly of each clutch for clutching the drum to its respective shaft end, each of said clutch drums having a drum gear connected thereto for rotation therewith, a pair of gears secured to said forward-reverse shaft, an idler gear in constant mesh with one of said gears on said forward-reverse shaft, a gear mounted on said input shaft for rotation therewith and being axially shiftable therealong for meshing engagement with said idler gear or the other of said gears on said forward-reverse shaft, a first idler gear secured to said idler shaft and in constant mesh with said drum gears associated with said input shaft and said forward-reverse shaft and also in constant mesh with the drum gears of two of said ratio clutches, a second idler gear secured to said idler shaft and in constant mesh with the drum gears of the other two of said ratio clutches, a first gear secured to one of said intermediate shafts, a second gear secured to the other of said intermediate shafts, and a pair of gears secured to said output shaft and in constant mesh respectively with said first and second gears on said intermediate shafts.

7. A multi-ratio change speed transmission providing eight drive ratios in one direction and four drive ratios in the other direction comprising a housing having front and rear vertically disposed walls forming a space therebetween, six rotatable shafts journaled in said housing and arranged in parallel relation including an input shaft, a forward-reverse shaft, an idler shaft, a pair of intermediate shafts and an output shaft, a first clutch located at one end of said input shaft outwardly of said rear wall, a second clutch located at one end of said forward-reverse shaft outwardly of said rear wall, four ratio clutches located respectively at the ends of said pair of intermediate shafts outwardly of said front and rear walls respectively, each of said six clutches including a plurality of friction disk members carried by the respective shaft end for rotation therewith, a rotatable drum surrounding the respective shaft end and carrying a plurality of friction disks interleaved with said friction disks on the shaft, and means for compressing the disk assembly of each clutch for clutching the drum to its respective shaft end, each of said clutch drums having a drum gear connected thereto for rotation therewith, a pair of gears secured to said forward-reverse shaft intermediate of said front and rear walls, an idler gear intermediate of said front and rear walls and in constant mesh with one of said gears on said forward-reverse shaft, a gear mounted on said input shaft for rotation therewith intermediate of said front and rear walls and being axially shiftable therealong for meshing engagement with either said idler gear or the other of said gears on said forward-reverse shaft, a first idler gear secured to said idler shaft outwardly of said rear wall and in constant mesh with said drum gears associated with said input shaft and said forward-reverse shaft and also in constant mesh with the drum gears of two of said ratio clutches, a second idler gear secured to said idler shaft outwardly of said front wall and in constant mesh with the drum gears of the other two of said ratio clutches, a first gear secured to one of said intermediate shafts intermediate of said front and rear walls, a second gear secured to the other of said intermediate shafts intermediate of said front and rear walls, and a pair of gears secured to said output shaft intermediate of said front and rear walls and in constant mesh respectively with said first and second gears on said intermediate shafts.

8. The multi-ratio change speed transmission of claim 7 wherein said input shaft is located near the top of said housing walls, said forward-reverse shaft is positioned laterally of said input shaft, said idler shaft is located at a level below said input and forward-reverse shafts, said intermediate shafts are located at a level below said idler shaft, and said output shaft is located at a level below said intermediate shafts.

9. In a transmission, an input shaft and a forward-reverse shaft, a pair of gears secured to one of said shafts, an idler gear in constant mesh with one of said pair of gears, a gear mounted on the other of said shafts for rotation therewith and being axially shiftable therealong for meshing engagement with either said idler gear or the other of said pair of gears, a first clutch gear rotatable on said input shaft, a first clutch adapted to selectively connect said first clutch gear to said input shaft, a second clutch gear rotatable on said forward-reverse shaft, a second clutch adapted to selectively connect said second clutch gear to said forward-reverse shaft, and gear means selectively driven from said first and second clutch gears.

10. In a transmission, an input shaft and a forward-reverse shaft, a pair of gears secured to one of said shafts, an idler gear in constant mesh with one of said pair of gears, a gear mounted on the other of said shafts for rotation therewith and being axially shiftable therealong for meshing engagement with either said idler gear on the other of said pair of gears, a pair of intermediate shafts, means for driving said intermediate shafts selectively from said input or forward-reverse shafts including a plurality of gears and four clutches associated with said intermediate shafts, an output shaft, and gear means for drivingly interconnecting said intermediate shafts and said output shaft.

References Cited by the Examiner
UNITED STATES PATENTS

| | | | |
|---|---|---|---|
| 2,966,067 | 12/1960 | Sommer | 74—355 |
| 3,126,752 | 3/1964 | Bolster | 74—359 |

DAVID J. WILLIAMOWSKY, *Primary Examiner.*

H. S. LAYTON, *Assistant Examiner.*